Feb. 19, 1935. O. A. ROSS 1,991,630
APPARATUS FOR PRINTING SOUND MOTION PICTURE FILM
Original Filed Sept. 18, 1928 2 Sheets-Sheet 1
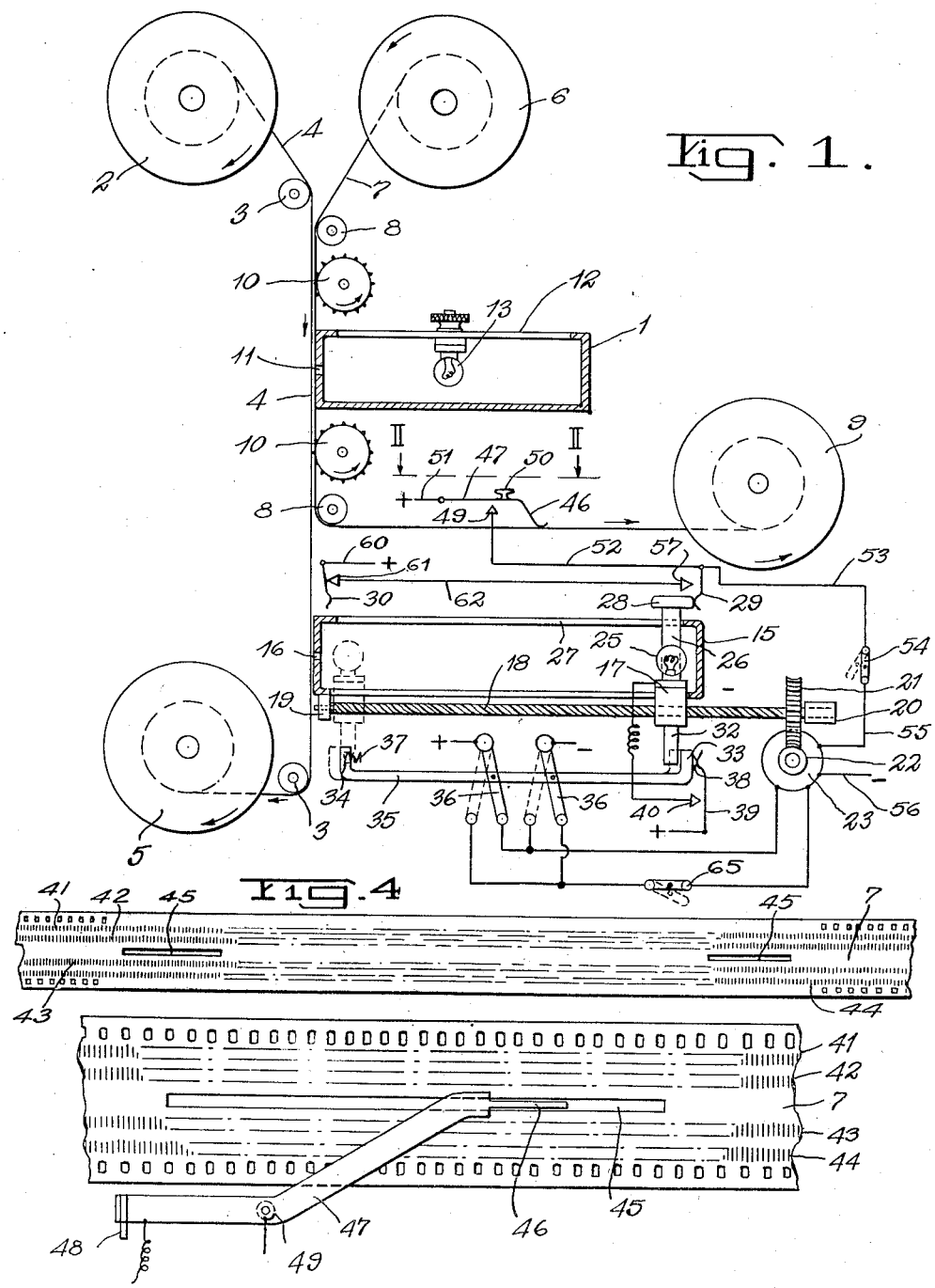

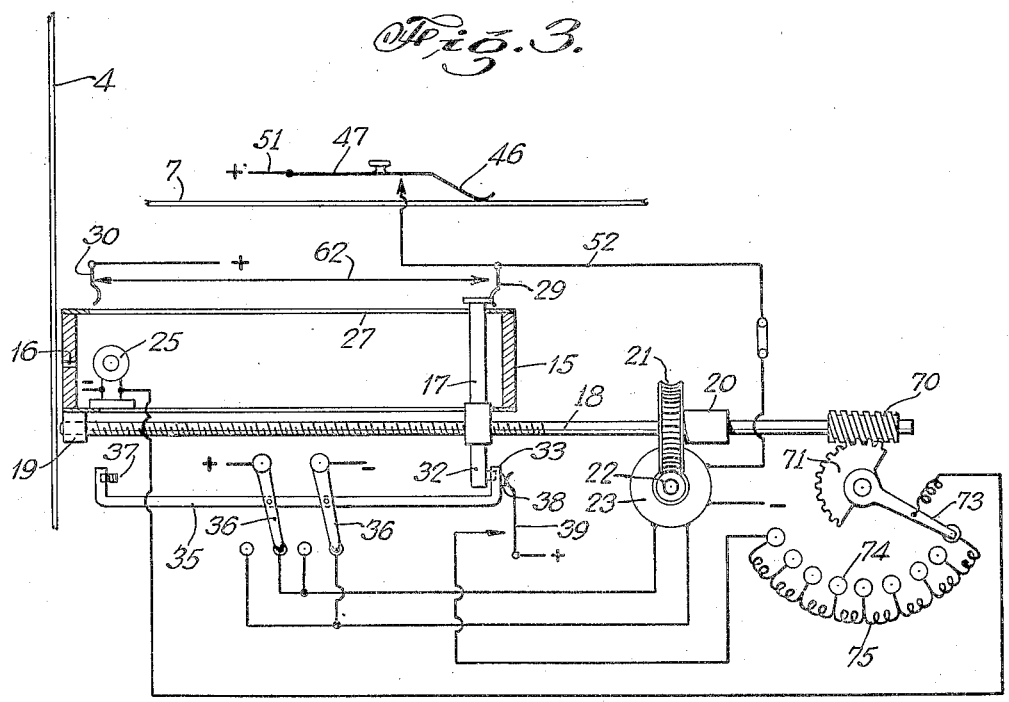

UNITED STATES PATENT OFFICE 1,991,630

APPARATUS FOR PRINTING SOUND MOTION PICTURE FILMS

Oscar A. Ross, New York, N. Y.

Application September 18, 1928, Serial No. 306,654
Renewed September 1, 1933

21 Claims. (Cl. 95—75)

This invention relates to apparatus for producing positive films and more particularly that class of films known as motion picture films, whereon sound records only or a combination of sound and action records are imprinted thereon.

Motion pictures are more generally recorded in series of scenes, said scenes being "faded in" and "faded out" for more pleasing rendition thereof during their exhibition. Where sound, as for example, incidental accompanying orchestral music, is presented simultaneously with the action pictures, it is usually preferable to fade in and out the accompanying musical selections previously adapted to the various action scenes presented, and under many conditions it is preferable to produce the fade in and fade out sound effects when printing the positive film rather than producing such effects when the negative film is initially produced and as more fully described in my co-pending application Serial No. 306,652 filed Sept. 18th, 1928.

It is therefore one object of this invention to furnish means whereby sound tracks on positive motion picture films may be graduatedly fogged during the printing process whereby the reproduced sounds from said "fogged" sound tracks thereon may be appropriately faded in and out, preferably simultaneously with the action record, as a presentation of said film or films is made.

Other objects and advantages will appear as the description of the invention progresses, and the novel feature of the invention will be pointed out in the appended claims.

This invention consists in the novel construction and arrangement of parts hereinafter described, delineated in the acompanying drawings, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and in which:—

Figure 1 is a side part plan, part sectional and part diagrammatic view of one embodiment of the invention, and, Fig. 2 is an enlarged top plan view of a portion of the apparatus shown in Fig. 1, taken on line 2—2 of Fig. 1, and Fig. 3 is a modified form of the invention, and Fig. 4 is a plan view of a length of film showing both starting and stopping control stations.

Referring to Figures 1 and 2 showing portions of a known form of printing machine 1, to which applicant's invention has been applied, said machine comprises in part, positive raw stock feed reel 2 from which is fed over rollers 3—3, raw stock positive film 4 which after exposure is wound on take up reel 5. Also developed negative feed reel 6 from which developed negative film 7 is fed over rollers 8—8 to take up reel 9, suitably driven sprockets 10—10 acting to advance both of said films 4 and 7 over light slit 11 of housing 12, adjustably supporting lamp or light source 13.

Referring now to applicant's improvement, housing 15 having light slit 16 exposed to the sound track produced by slit 11, has lamp, or light source unit 17 arranged to be moved longitudinally of said housing by screw 18 supported in bearings 19 and 20, said screw having a gear 21 actuated by worm 22 driven by motor 23.

Lamp unit 17 supports lamp or light source 25 and also bracket 26 extending through slot 27 of housing 15, the protruding end thereof supporting insulated abutment member 28 arranged to actuate circuit closers 29 and 30. Said unit also has a downwardly extending extension 32 arranged to abut extensions 33 and 34 of switch bar 35 to which are insulatively pivoted pole changing switch levers 36—36, said extensions supporting suitable buffer springs 37—37.

Energy to lamp 25 is normally interrupted by insulated button 38 restraining contact lever 39 away from contact 40.

Light source 13, through slit 11 is assumed to be printing any one or more of sound tracks, as 41, 42, 43 or 44 onto positive film 4.

Negative film 7 is preferably supplied with control slots, as 45 arranged to permit entry of finger 46 of contact lever 47 pivoted on pin 48 and arranged to contact with contact button 49 when finger 46 enters said slot.

Said slots are arranged at the entrance and exit ends of each fade in and fade out section to be graduatedly fogged.

Assume that the printing of the selected sound selection has been completed and that it is desired to fade out the recorded sound. The slot 45 at the right of film 7, Fig. 4, will move under finger 46 whereupon lever 47 is lowered to establish the following circuit:—

Starting circuit

From positive energy, wire 51, lever 47, contact 49, wires 52 and 53, switch 54, wire 55 to a primary winding of motor 23 and thence through wire 56 to negative energy. As this circuit is established said motor rotates in a direction whereby lamp unit 17 is moved to the left and on the initial movement thereof contact lever 29 engages contact 57, and as lever 47 is raised at the rear end of slot 20, the circuit is formed as follows:—

Retaining circuit

From positive energy, wire 60, contact lever 30, contact 61, wire 62, contact 57, contact lever 29 in closed position, wire 53, switch 54, wire 55, motor 23 and wire 56 to negative energy.

As unit 17 is initially moved to the left, contact lever 39 also contacts with contact 40 whereupon an obvious circuit to lamp 25 is established. As said last named circuit is established a slight fogging of the selected film track on positive film 4 occurs and as lamp 25 is gradually moved to the left by rotation of screw 18, said fogging will become graduatedly more intense as said film is also moved, and at the extreme movement to the left thereof, said fogging will be sufficiently intense whereby said sound track will be rendered substantially opaque when and as said film is developed. Such a graduatedly fogged positive film is more fully described in my co-pending application, Serial No. 236,980, filed Dec. 1st, 1927.

As said light unit 17 approximates the extreme left end of its movement, the insulated member 28 abuts contact lever 30 and the "retaining circuit" is opened thereby stopping motor 23. Simultaneously with opening said circuit spring 37 is compressed, by the over-run of said motor, bar 35 is quickly moved to the left whereby pole changing levers 36—36 are also carried to the left and in an obvious manner will reverse the polarity of the secondary winding of motor 23 whereby said motor will operate to move light unit 17 to the right when energy is again supplied thereto.

Assume further that the section of film in which the selected sound track was to be cancelled has passed and it is now desired to "fade in" the sound track. The slot at the left of film 7, Fig. 4, will pass under contact lever 47 and as finger 46 enters into said slot, the "starting circuit" is again established to motor 23, however as pole changing levers 36—36 are now in the dotted position shown said motor will rotate in a reverse direction whereby light unit 17 is comparatively slowly moved to the right, and whereby the light intensity reaching film 4 through slit 11 will be graduatedly decreased and likewise the fogging of the sound track registering with said slit will also be graduatedly decreased, a substantially nil fogging occurring as said unit reaches the extreme right hand end of its movement and at which time button 38 will abut lever 39 thereby opening the circuit to lamp 25.

If desired a fade in or fade out may be effected on any portion of the selected sound track by manually depressing lever 47 by means of button 50, such depression merely acting to deflect negative film 7 downwardly.

When the printer is not in use, the secondary, or pole changing winding, may be opened by switch 65.

Referring to the modified form in the invention shown in Fig. 3, the lamp 25 is removed from support 17 and is made fixed in housing 15. The shaft 18 is supplied with a worm or pinion 70 engaging with gear sector 71 arranged to move contact lever 73 over contacts 74 and therefore vary the light intensity of lamp 25 by alternately excluding and including the resistance 75, this manner of light fogging film for producing faded sound track portions being more fully described in my copending application Serial No. 306,652, filed September 18th, 1928.

It is to be understood that positive film 4 is in motion as lamp unit 17 is moved to and from the light slit 16.

What I claim is: —

1. The combination with a raw positive film and a negative film having a photographic record thereon to be printed onto the positive film; of means for simultaneously advancing the films in printing relation, means for effecting a print of the negative record onto a record track of the positive film as the films are advanced, a light source arranged to be moved toward and away from the record track on the positive film normally positioned remote therefrom, and means for moving the light source at a uniform speed toward the record track whereby a gradual increased fogging of the record will occur as the film is advanced.

2. The combination with a raw positive film and a negative film having a photographic record thereon to be printed onto the positive film; of means for simultaneously advancing the films in printing relation, means for effecting a print of the negative record onto the record track of the positive film as the films are advanced, a light source arranged to be moved toward and away from the record track on the positive film normally positioned remote therefrom, and means for moving the light source at a uniform speed toward and away from the record track whereby a gradual increase in the fogging will occur as the films are advanced.

3. The combination with a raw positive film and a negative film having a photographic record thereon to be printed onto the positive film; of means for simultaneously advancing the film in printing relation, means for effecting a print of the negative record onto a record track of the positive film as the films are advanced, means for light fogging the printed track on the positive film, means controlled by the movement of the negative film for rendering the light fogging means effective to fog the record track on the positive film as the films are advanced, and means controlled by the light fogging means for effecting cancellation thereof a predetermined period after it has been rendered effective by the negative film.

4. The combination with a raw positive film and a negative film having a photographic record thereon to be printed onto the positive film; of means for simultaneously advancing the films in printing relation, means for effecting a print of the negative record onto a record track of the positive film as the films are advanced, a light source arranged to be moved toward and away from the record track on the positive film, means controlled by the movement of the negative film for effecting a movement of the light source toward the record track, means controlled by the movement of the light source toward the film for cancelling the movement thereof, means controlled by a further movement of the negative film for effecting a movement of the light source away from the record track, and means controlled by movement of the light source away from the record track for cancelling the movement thereof.

5. The combination with a raw positive film and a negative film having a photographic record thereon to be printed onto the positive film; of means for simultaneously advancing the films in printing relation, means for effecting a print of the negative record onto a record track of the positive film; as the films are advanced, a light source arranged to be moved toward and away from the record track on the positive film, and means controlled by the movement of the negative film for moving the light source toward and away from the record track whereby a gradually increasing obscuration followed by an obscuration of uniform density and thereafter followed by a gradually decreasing obscuration will be super-imposed over the printed record when the positive film is developed.

6. The combination with a raw positive film and a negative film having a photographic record thereon to be printed onto the positive film; of means for simultaneously advancing the films in printing relation, means for effecting a print of the negative record onto a record track of the positive film as the films are advanced, a light source arranged to be moved toward and away from the record track on the positive film, means controlled by the movement of the negative film for effecting a movement of the light source toward the film, and means controlled by the movement of the light source for cancelling the movement thereof a predetermined interval of time after movement thereof has been effected by the negative film.

7. The combination with a developed sound film and a light sensitive film advanced synchronously, the developed film having a plurality of successively spaced sound records thereon, means for photographically recording the records of the developed film onto the light sensitive film as they advance, electrically responsive sound fading means extraneous to the films for photographically fading in the beginning of the sound records on the light sensitive film upon the energizing of the photographic fading means by energy of one polarity and fading out the beginning of the records upon energizing the fading means by energy of opposite polarity, a source of polarized energy, and means actuated by advancement of the developed film for periodically energizing the photographic fading means with energy of one polarity from the source alternately with energization thereof with energy of opposite polarity from the source.

8. The combination with apparatus for photographically reproducing the sound track of a developed sound film as a corresponding exposed sound track on a light sensitive film advanced synchronously therewith, of electrically responsive normally inoperative sound fading means arranged to gradually photographically vary the optical density longitudinally of selected portions of the exposed sound track upon being rendered operative, and means responsive to the advancement of control stations on the developed sound film for rendering the sound fading means operative as the selected track portions advance alternately with cancelling the operation thereof as the non-selected track portions advance whereby the selected track portions will be optically faded when the light sensitive film is developed.

9. The combination with apparatus for photographically reproducing the sound track of a developed sound film as a corresponding exposed sound track on a light sensitive film advanced synchronously therewith, of electrically responsive normally inoperative sound fading means arranged to gradually photographically fade out one selected portion of the exposed sound track and gradually photographically fade in a succeeding longitudinal portion thereof upon rendering the sound fading means operative, and means responsive to the advancement of control stations on the developed sound film for rendering the sound fading means operative as the selected track portions advance alternately with cancelling the operation thereof as the non-selected track portions advance whereby the selected sound track portions will be optically faded out and in when the light sensitive film is developed.

10. The combination with apparatus for photographically reproducing the sound track of a developed sound film as a correspondingly exposed sound track on a light sensitive film advanced synchronously with the developed sound film, of electrically responsive normally inoperative sound fading means arranged to gradually photographically fade out one selected longitudinal portion of the exposed sound track and photographically cancel a succeeding selected longitudinal portion of the exposed sound track upon being rendered operative, and means responsive to the advancement of control stations on the developed sound film for rendering the sound fading means operative as the selected track portions advance and cancel the operation thereof as the non-selected track portions advance.

11. The combination with apparatus for photographically reproducing the sound track of a developed sound film as a corresponding exposed sound track on a light sensitive film advanced synchronously with the developed sound film, of electrically responsive normally inoperative sound fading means arranged to photographically cancel one selected longitudinal portion of the exposed sound track and gradually photographically fade in a succeeding selected portion thereof upon rendering the sound fading means operative, and means responsive to the advancement of control stations on the developed sound film for rendering the sound fading means operative as the selected track portions advance and cancelling the operation thereof as the non-selected portions advance.

12. The combination with apparatus for photographically reproducing the sound track of a developed sound film as a corresponding exposed sound track on a light sensitive film advanced synchronously with the developed sound film, of sound fading means including a circuit controller arranged to photographically fade selected longitudinal portions of the exposed sound track upon actuating the circuit controller, and control stations on the developed sound film for actuating the circuit controller as the selected sound track portions advance whereby the selected sound track portions will be optically faded with respect to the corresponding non-faded track portions of the developed sound film.

13. The combination with apparatus for photographically reproducing the sound track of a developed sound film as a corresponding exposed sound track on a light sensitive film advanced synchronously with the developed film, of sound fading means including a circuit controller arranged to gradually fade out one selected longitudinal portion of the exposed sound track and gradually fade in a succeeding selected longitudinal portion thereof upon actuating the circuit controller, and control stations on the developed sound film for actuating the circuit controllers as the selected sound track portions advance whereby the selected track portions will be optically faded out and in with respect to the corresponding non-faded track portions of the developed sound film.

14. The combination with apparatus for photographically reproducing the sound track of a developed sound film as a corresponding exposed sound track on a light sensitive film advanced synchronously with the developed film, the sound track of the developed sound film having a normal uniform optical density throughout the length thereof whereby the normal optical density of the developed light sensitive sound film would be correspondingly uniform throughout the length thereof, of normally inoperative sound fading means arranged to gradually photographically change the normal optical density of one selected portion of the exposed sound track and gradually photographically restore the density of a succeeding selected track portion to normal upon being rendered operative as the films advance, and means responsive to control stations on the advancement of the developed sound film for rendering the sound fading means operative as the selected track portions advance and cancel the operation thereof as the non-selected track portions advance whereby the selected sound track portions will be faded out and in when the light sensitive film is developed.

15. The combination with apparatus for photographically reproducing the sound track of a developed sound film as a corresponding exposed sound track on a light sensitive film advanced synchronously with the developed sound film, the sound track of the developed sound film having a normal uniform optical density throughout the length thereof whereby the normal optical density of the developed light sensitive film would be correspondingly uniform throughout the length thereof, of sound fading means including a circuit controller arranged to gradually photographically change the normal optical density of one selected longitudinal portion of the exposed sound track to mal-normal density and gradually photographically restore the mal-normal density of a succeeding selected longitudinal track portion to normal density upon actuating the circuit controller, and control stations on the developed sound film for operating the circuit controllers as the selected track portions advance whereby the selected track portions will be optically faded out and in when the light sensitive film is developed.

16. The combination with a light sensitive film and a developed sound film, the developed sound film having a photographic sound record to be printed onto the light sensitive film, of means for advancing the films synchronously in printing relation, means for producing a print of the developed sound record onto a sound record track of the light sensitive film as they advance, normally inoperative sound fading means arranged to gradually photographically vary the optical density of selected longitudinal portions of the printed record upon being rendered operative as the films advance, and means responsive to the advance of control stations on the developed film for rendering the sound fading means operative as the selected printed portions advance alternately with rendering the fading means inoperative as the non-selected portions thereof advance whereby the selected track portions will be optically faded when the light sensitive film is developed.

17. The combination with a developed sound film and a light sensitive film, the developed sound film having a photographic sound record thereon, of means for advancing the films synchronously, means for producing an exposed sound record on the light sensitive film corresponding to the sound record on the developed sound film as they advance, normally inoperative sound fading means arranged to gradually photographically vary the optical density longitudinally of selected portions of the exposed sound record upon being rendered operative as the films advance, and means responsive to the advancement of control stations on the developed sound film for rendering the sound fading means operative solely as the selected exposed sound record portions advance whereby the selected portions will be optically faded with respect to the corresponding portions on the developed sound film when the light sensitive film is developed.

18. The combination with a developed sound film and a light sensitive film advanced synchronously, the developed sound film having a sound record track longitudinally thereof, of means for producing an exposed record on the light sensitive film corresponding to the sound record track of the developed sound film as the films advance, normally inoperative sound fading means affecting the exposed sound record track arranged to photographically fade selected longitudinal portions of the exposed record upon being rendered operative, and means actuated by control stations on the developed sound film during the advancement thereof for rendering the sound fading means operative when the selected portions advance and cancel the operation thereof when the non-selected portions advance whereby the selected portions will be optically faded with respect to the corresponding portions on the developed sound film when the light sensitive film is developed.

19. The combination with a developed sound film and a light sensitive film advanced synchronously therewith, the developed sound film having a photographic record comprising a plurality of longitudinally spaced sound records thereon, of means for producing an exposed record on the light sensitive film corresponding to the record on the developed sound film as they advance, electrically responsive normally inoperative sound fading means affecting the exposed record arranged to photographically fade in the beginning and fade out the end of the exposed sound records upon energizing the sound fading means as the films advance, a normally inoperative circuit controller for energizing the sound fading means upon being actuated, and control stations on the developed sound film arranged to actuate the circuit controllers as the beginning and end of the exposed sound records advance and de-energize the sound fading means as the intermediate portion thereof advances whereby the ends of the sound records will be optically faded when the light sensitive film is developed.

20. The combination with a developed sound film and a light sensitive film advanced synchronously, the developed sound film having a plurality of successively spaced sound records longitudinally thereof, means for producing an exposed record on the light sensitive film corresponding to the record of the developed sound film as the films advance, normally inoperative sound fading means affecting the exposed record arranged to photographically fade the end portions of the exposed sound records upon being rendered operative, and means actuated by control stations on the developed sound film during the advance thereof for rendering the sound fading means operative when the end portions of the exposed sound records advance and cancel the operation thereof when the intermediate portions of the sound records advance whereby the end portions of the sound records will be optically faded with respect to the corresponding portions on the developed sound film.

21. The combination with apparatus for photographically reproducing the sound track of a developed sound film as a corresponding exposed sound track on a light sensitive film advanced synchronously with the developed sound film, of sound fading means affecting the exposed sound track arranged to photographically fade selected portions thereof upon being rendered operative as the films advance, and means responsive to the advancement of control stations on the developed sound film for rendering the sound fading means operative solely when the selected sound track portions advance whereby the selected portions will be optically faded with respect to the corresponding portions on the developed sound film when the light sensitive film is developed.

OSCAR A. ROSS.